United States Patent
Wu et al.

(10) Patent No.: US 12,249,724 B2
(45) Date of Patent: Mar. 11, 2025

(54) BATTERY CELL, BATTERY, METHOD AND DEVICE FOR PREPARING A BATTERY CELL

(71) Applicant: CONTEMPORARY AMPEREX TECHNOLOGY (HONG KONG) LIMITED, Hong Kong (CN)

(72) Inventors: Ningsheng Wu, Ningde (CN); Chengyou Xing, Ningde (CN); Peng Wang, Ningde (CN); Chengdu Liang, Ningde (CN); Quankun Li, Ningde (CN); Wenlong Kang, Ningde (CN); Lingyan Jiang, Ningde (CN); Weigan Xie, Ningde (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 482 days.

(21) Appl. No.: 17/137,312

(22) Filed: Dec. 29, 2020

(65) Prior Publication Data
US 2022/0052404 A1    Feb. 17, 2022

Related U.S. Application Data

(63) Continuation of application No. PCT/CN2020/109654, filed on Aug. 17, 2020.

(51) Int. Cl.
*H01M 50/166*  (2021.01)
*H01M 50/148*  (2021.01)
(Continued)

(52) U.S. Cl.
CPC ....... *H01M 50/148* (2021.01); *H01M 50/166* (2021.01); *H01M 50/204* (2021.01); *H01M 50/271* (2021.01); *H01M 2220/20* (2013.01)

(58) Field of Classification Search
CPC ............. H01M 50/148; H01M 50/166; H01M 50/204; H01M 50/271; H01M 2220/20
See application file for complete search history.

(56) References Cited

U.S. PATENT DOCUMENTS

| | | | |
|---|---|---|---|
| 2005/0118501 A1 | 6/2005 | Hashimoto et al. | |
| 2008/0102366 A1 | 5/2008 | Anglin et al. | |

(Continued)

FOREIGN PATENT DOCUMENTS

| | | | |
|---|---|---|---|
| CN | 104011896 A | 8/2014 | |
| CN | 105470413 A | 4/2016 | |

(Continued)

OTHER PUBLICATIONS

The extended European search report for EP Application No. 20827957.0, dated Nov. 26, 2021, 7 pages.

(Continued)

*Primary Examiner* — Matthew T Martin
*Assistant Examiner* — Alexandra J Simmons
(74) *Attorney, Agent, or Firm* — East IP P.C.

(57) ABSTRACT

Embodiments of the present disclosure provides a battery cell, a battery, an electrical device and a device for preparing a battery cell. The battery cell includes a housing being hollow and including an opening, and an end cover assembly includes an end cover and an insulator. The end cover is configured to be connected to the opening of the housing and at least the part of the end cover is inserted into the housing. A part of the end cover inserted into the housing includes an end surface and a first side surface. The end surface is substantially perpendicular to an insertion direction of the end cover. The first side surface is distributed along a periphery of the end surface and is opposite to an inner wall surface of the housing.

20 Claims, 6 Drawing Sheets

(51) Int. Cl.
*H01M 50/204* (2021.01)
*H01M 50/271* (2021.01)

(56) References Cited

U.S. PATENT DOCUMENTS

| | | | |
|---|---|---|---|
| 2008/0220316 A1 | 9/2008 | Berkowitz et al. | |
| 2010/0159288 A1* | 6/2010 | Kim .................... | H01M 50/169 429/7 |
| 2015/0221905 A1 | 8/2015 | Guo et al. | |
| 2019/0081288 A1* | 3/2019 | Oide et al. .......... | H01M 50/103 |
| 2019/0237712 A1 | 8/2019 | Zhang et al. | |
| 2020/0091468 A1* | 3/2020 | Wong et al. ........ | H01M 50/167 |

FOREIGN PATENT DOCUMENTS

| | | |
|---|---|---|
| CN | 108352466 A | 7/2018 |
| CN | 207818650 U | 9/2018 |
| CN | 209658242 U | 11/2019 |
| CN | 209658246 U | 11/2019 |
| CN | 210136949 U | 3/2020 |
| CN | 212161863 U | 12/2020 |
| CN | 213401344 U | 6/2021 |
| JP | 2007512671 A | 5/2007 |
| JP | 2008502120 A | 1/2008 |
| JP | 2014093257 A | 5/2014 |
| JP | 2018022586 A | 2/2018 |
| JP | 2019023971 A | 2/2019 |
| JP | 2019083151 A | 5/2019 |
| KR | 20070082943 A | 8/2007 |
| KR | 20180115485 A | 10/2018 |
| WO | 2013093965 A1 | 4/2015 |
| WO | 2017082317 A1 | 9/2018 |
| WO | 2020140653 A1 | 7/2020 |

OTHER PUBLICATIONS

The International search report for PCT Application No. PCT/CN2020/109654, dated May 20, 2021, 10 pages.
The First Office Action for EP Application No. 20827957.0, dated Jul. 26, 2022, 4 pages.
The First Office Action for Chinese Application No. 202080098700.2, dated Aug. 24, 2023, 12 pages.
The Office Action for Australian Application No. 2020463875, dated Jun. 16, 2023, 3 pages.
The Office Action for Japanese Application No. 2022-544092, dated Jul. 28, 2023, 8 pages.
The Second Office Action for Chinese Application No. 202080098700.2, dated Nov. 17, 2023, 9 pages.

* cited by examiner

BATTERY CELL, BATTERY, METHOD AND DEVICE FOR PREPARING A BATTERY CELL

CROSS REFERENCE

This application is a continuation of International Application No. PCT/CN2020/109654, filed on Aug. 17, 2020, the contents of which are hereby incorporated by reference in their entireties.

TECHNICAL FIELD

The present disclosure relates to a field of an energy storage equipment, in particular to a battery cell, a battery, and a method and device for preparing a battery cell.

BACKGROUND

A lithium-ion battery has advantages of small size, high energy density, high power density, numerous recycles, long storage time and the like. It is widely used in some electronic equipment, electric vehicles, electric toys and electric equipment. For example, it is widely used in mobile phones, notebook computers, battery cars, electric cars, electric airplanes, electric ships, electric toy cars, electric toy ships, electric toy airplanes, electric tools and the like.

With a continuous development of lithium-ion battery technology, higher requirements are put forward for safety performance of a lithium-ion battery. In a process of assembling an end cover assembly and a housing of an existing lithium ion battery, scratches are likely to occur between the end cover assembly and the housing, which causes a metal wire or metal particles to fall into the lithium ion battery and thus possibly causes a short circuit.

SUMMARY

The present disclosure provides a battery cell, a battery, an electrical device, and a method and device for preparing a battery cell that overcome the above-mentioned problem or at least partially solve the above-mentioned problem.

In a first aspect of the present disclosure, it is provided a battery cell comprising:
a housing being hollow and comprising an opening, and
an end cover assembly comprising an end cover and an insulator, the end cover being configured to be connected to the opening of the housing and at least a part of the end cover being inserted into the housing, the part of the end cover inserted into the housing comprises an end surface and a first side surface, wherein the end surface is substantially perpendicular to an insertion direction of the end cover, the first side surface is distributed along a periphery of the end surface and is opposite to an inner wall surface of the housing, and wherein the inner wall surface is substantially parallel to the insertion direction of the end cover, and the end surface and the first side surface intersect to form a first edge, and
wherein the insulator is connected to the end surface, and the insulator extends beyond the first edge toward the inner wall surface in a first direction, and wherein the first direction is a direction perpendicular to the insertion direction of the end cover and towards the inner wall surface.

In a technical solution of an embodiment of the present disclosure, the insulator extends beyond the first edge toward the inner wall surface in the first direction. During an insertion of the end cover into the housing, a part of the insulator located between the first edge and the inner wall surface is closer to the inner wall surface than the first edge. Therefore, the part of the insulator located between the first edge and the inner wall surface is easier to contact the inner wall surface. To a certain extent, metal wire generated by the contact between the first edge and the housing can be reduced and safety performance of the battery cell can be improved.

In some embodiments, the insulator comprises a second side surface, the second side surface is substantially parallel to the inner wall surface, and along the first direction, the second side surface is located between the first edge and the inner wall surface. In this way, a volume of the insulator can be increased, so that the insulator does not deform when it contacts the inner wall surface.

In some embodiments, the first side surface comprises a first surface and a second surface, the first surface is substantially parallel to the inner wall surface, and the second surface connects the first surface and the end surface and is inclined to form a chamfered surface in a direction away from the inner wall surface relative to the first surface. In this way, dimensions of a gap between the second surface and the inner wall surface become larger and larger along the insertion direction of the end cover, so that the end cover can be inserted into the housing more conveniently.

In some embodiments, the second surface intersects the end surface to form the first edge, the second surface intersects the first surface to form a second edge, and the second edge is located between the first edge and the inner wall surface.

In some embodiments, the second side surface is located between the second edge and the inner wall surface. In this way, during insertion of the end cover into the housing, the second side surface of the insulator can prevent the first edge and the second edge at the same time from scratching the inner wall surface, thereby avoiding generation of metal wires.

In some embodiments, the second side surface is located between the first edge and the second edge. In this way, it is possible to prevent the first edge from scratching the inner wall surface to a certain extent, and to ensure that the dimension of the gap between the second side surface and the inner wall surface is large enough to facilitate the insertion of the insulator into the housing.

In some embodiments, the insulator comprises a third side surface connected to the second side surface, the third side surface is connected to an end of the second side surface away from the end surface, and is inclined to form a chamfered surface in a direction away from the inner wall surface relative to the second side surface.

In some embodiments, the insulator comprises a fixing part and a side part connected to each other, the fixing part is connected to the end surface, the side part is located on a side of the fixing part away from the end surface and distributed along a periphery of the fixing part, and the second side surface is located on a surface of the side part opposite to the inner wall surface.

In some embodiments, a second recess is provided at a connection between the side part and the fixing part, the second recess is disposed opposite to the inner wall surface, and an opening of the second recess is opposite to the inner wall surface.

In some embodiments, a bottom wall of the second recess is located on a side of the first edge away from the inner wall surface. In this way, gas generated can be reduced to a certain extent, thereby ensuring welding strength.

In some embodiments, the end cover comprises an insertion part and a connection part, the insertion part is located within the housing, the first side surface is located on a surface of the insertion part opposite to the inner wall surface, and along the first direction, the connection part extends beyond the insertion part.

In some embodiments, the housing is made of metal, and a hardness of the insulator is less than a hardness of the housing.

In a second aspect of the present disclosure, it is provided a battery comprising:
a plurality of battery cells of the above embodiments;
a converging component for electrically connecting the plurality of battery cells;
a case for accommodating the plurality of battery cells and the converging component.

In a third aspect of the present disclosure, it is provided an electrical device comprising the battery of the above embodiment.

In a fourth aspect of the present disclosure, it is provided a method for preparing a battery cell comprising:
providing a housing being hollow and comprising an opening;
providing an end cover assembly comprising an end cover and an insulator;
inserting at least a part of the end cover into the housing,
wherein the end cover is configured to be connected to the opening of the housing, and the part of the end cover inserted into the housing comprises an end surface and a first side surface, the end surface being substantially perpendicular to an insertion direction of the end cover, the first side surface being distributed along a periphery of the end surface and is opposite to an inner wall surface of the housing, and wherein the inner wall surface extends substantially parallel to the insertion direction of the end cover, and the end surface and the first side surface intersect to form a first edge, and
wherein the insulator is connected to the end surface, and the insulator extends beyond the first edge toward the inner wall surface along a first direction, and wherein the first direction is a direction perpendicular to the insertion of the end cover and toward the inner wall surface.

In a fifth aspect of the present disclosure, it is provided a device for preparing a battery cell that comprises:
a providing module for providing a housing being hollow and comprising an opening, and for providing an end cover assembly comprising an end cover and an insulator;
a mounting module for inserting at least a part of the end cover into the housing,
wherein the end cover is configured to be connected to the opening of the housing, and the part of the end cover inserted into the housing comprises an end surface and a first side surface, the end surface being substantially perpendicular to an insertion direction of the end cover, the first side surface being distributed along a periphery of the end surface and is opposite to an inner wall surface of the housing, wherein the inner wall surface is substantially parallel to the insertion of the end cover, and the end surface and the first side surface intersecting to form a first edge, and
wherein the insulator is connected to the end surface, and the insulator extends beyond the first edge toward the inner wall surface along a first direction, and wherein the first direction is a direction perpendicular to the insertion of the end cover and toward the inner wall surface.

BRIEF DESCRIPTION OF THE DRAWINGS

Drawings described here are used to provide a further understanding of the present disclosure and constitute a part of the present disclosure. Exemplary embodiments and descriptions of the present disclosure are used to explain the present disclosure and do not constitute an improper limitation of the present disclosure. In the drawings.

DETAILED DESCRIPTION

Figure 1:
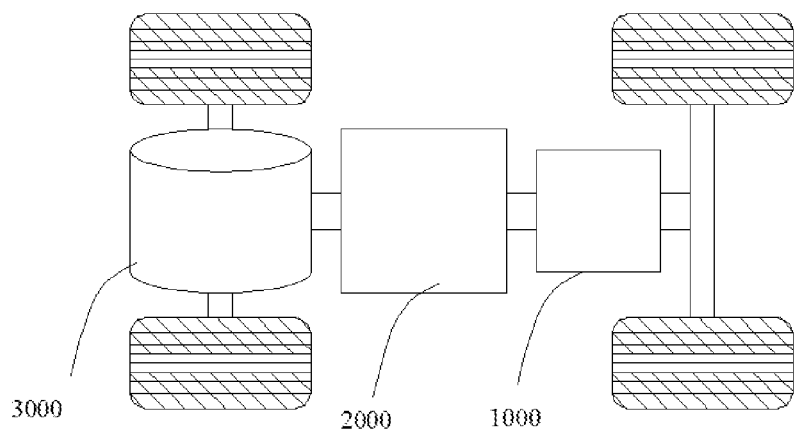
FIG. 1 is a schematic view of some embodiments of a vehicle of the present disclosure.

In order to make purposes, technical solutions and advantages of embodiments of the present disclosure clearer, the following will clearly and completely describe technical solutions in embodiments of the present disclosure with reference to drawings in embodiments of the present disclosure. Obviously, embodiments described are part of embodiments of the present disclosure and are not all of embodiments. Based on embodiments in the present disclosure, all other embodiments obtained by those skilled in the art without creative work fall within the protection scope of the present disclosure.

Unless otherwise defined, all technical and scientific terms used herein have the same meanings as commonly understood by those skilled in the technical field of the present disclosure. Terms used in the description of the present disclosure herein are only for describing specific embodiments and not limiting the present disclosure. Terms "including", "comprising" and any variation thereof in the description, claims and the above-mentioned brief description of the drawings of the present disclosure are intended to cover non-exclusive inclusions. Terms "first", "second", etc. in the description and claims or the above-mentioned brief description of the drawings of the present disclosure are used to distinguish different objects, rather than to describe a specific order or primary-secondary relationship.

Reference to "an embodiment" herein means that a specific feature, structure, or characteristic described in conjunction with the embodiment may be included in at least one embodiment of the present disclosure. The phrases appearing in various places in the specification does not necessarily refer to the same embodiment, nor is it an independent or alternative embodiment mutually exclusive with other embodiments. Those skilled in the art clearly and implicitly understand that embodiments described herein can be combined with other embodiments.

The term "and/or" in the context is only an association relationship describing associated objects, which means that there can be three relationships. For example, A and/or B can mean three situations, A exists alone, A and B exist at the same time, B exists alone. In addition, the character "/" in the context generally indicates that the associated objects before and after are in an "or" relationship.

In the present disclosure, the term "a plurality of . . . " or the like refers to two or more (including two). Similarly, "a plurality of groups" refers to two or more groups (including two groups), and "a plurality of pieces" refers to two or more pieces (including two pieces).

The battery cells and batteries described in embodiments of the present disclosure are applicable to various devices that use batteries, such as mobile phones, portable devices, notebook computers, battery cars, electric cars, ships, spacecraft, electric toys and electric tools. For example, spacecraft include airplanes, rockets, space shuttles and spaceships, etc. Electric toys include fixed or mobile electric toys, such as game consoles, electric car toys, electric ship toys and electric airplane toys, etc. Electric tools include metal cutting electric tools, grinding electric tools, assembly electric tools, and railway electric tools, such as electric drills, electric grinders, electric wrenches, electric screwdrivers, electric hammers, impact drills, concrete vibrators, and electric planers.

The battery cells and batteries described in embodiments of the present disclosure are not only applicable to the electrical devices described above, but also applicable to all devices that use batteries. However, for the sake of brevity, the following embodiments are all described with electric vehicles as examples.

For example, as shown in FIG. 1 which is a schematic structural view of a vehicle 4000 of an embodiment of the present disclosure. The vehicle 4000 may be a fuel vehicle, a gas car or a new energy car, and the new energy car may be a pure electric car or a hybrid car or an extended-range car, etc. A battery 1000, a controller 2000, and a motor 3000 may be provided inside the vehicle 4000, and the controller 2000 is used to control the battery 1000 to supply power to the motor 3000. For example, the battery 1000 may be provided in the bottom or front or rear of the vehicle 4000. The battery 1000 may be used for power supply of the vehicle 4000. For example, the battery 1000 may be used as an operating power source of the vehicle 4000 for a circuit system of the vehicle 4000, for example, for power requirements of the vehicle 4000 for starting, navigating, and running. In another embodiment of the present disclosure, the battery 1000 can be used not only as the operating power source for the vehicle 4000, but also as a driving power source for the car 4000, replacing or partially replacing fuel or natural gas to provide driving power for the car 4000.

In order to meet different power requirements, the battery may include a plurality of battery cells, wherein the plurality of battery cells may be connected in series, in parallel, or in hybrid connection. The hybrid connection refers to a combination of the series and parallel connections. Optionally, the plurality of battery cells may be connected in series or in parallel or in hybrid connection to form a battery module, and then a plurality of battery modules can be connected in series or in parallel or in hybrid connection to form a battery. In other words, the plurality of battery cells can directly form the battery, or form the battery module first, and then the battery modules forms the battery.

Figure 2:
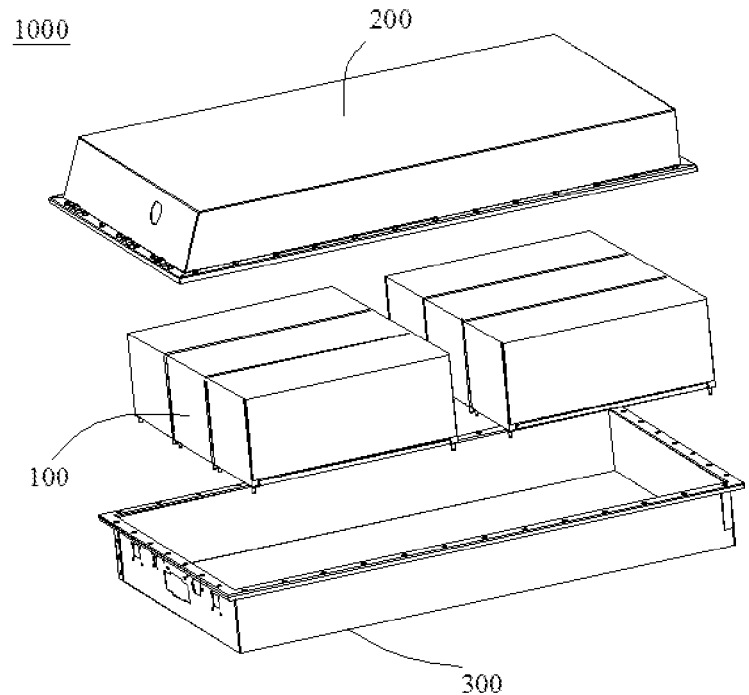
FIG. 2 is a schematic structural view of some embodiments of a battery of the present disclosure.

In another embodiment of the present disclosure, as shown in FIG. 2 which is a schematic structural view of a battery 1000 of an embodiment of the present disclosure, the battery 1000 includes a plurality of battery modules 100. For example, the battery 1000 includes the plurality of batteries modules 100, and the plurality of battery modules 100 may be connected in series or in parallel or in hybrid connection. The hybrid connection refers to a combination of the series and parallel connections. The battery 1000 may further include a case (or a cover) which is hollow inside, and the plurality of battery modules 100 are contained in the case. As shown in FIG. 2, the case includes two portions, which are referred to herein as a first portion 200 and a second portion 300 respectively. The first portion 200 covers the second portion 300 and thus they are connected together. A shape of the first portion 200 and the second portion 300 may be determined according to a shape of the combined plurality of battery modules 100. Each of the first portion 200 and the second portion 300 may include an opening. For example, both the first portion 200 and the second portion 300 may be hollow cuboids and each has only one face as an opening face. The opening of the first portion 200 and the opening of the second portion 300 are arranged oppositely, and the first portion 200 covers the second portion 300 to form the case with a closed chamber. The plurality of battery modules 100 are connected in parallel, connected in series or in hybrid connection, and then placed within the case formed by the first portion 200 covering the second portion 300.

Optionally, the battery 1000 may also include other structures, which will not be repeated here. For example, the battery 1000 may further include a converging component, which is used to realize electrical connection among the plurality of battery cells, such as in parallel connection, series connection, or hybrid connection. Specifically, the converging component can realize electrical connection among the battery cells by connecting electrode terminals of the battery cells. Further, the converging component may be fixed to the electrode terminal of the battery cell by welding. Electric energy of the plurality of battery cells can be further lead out via a conductive mechanism through the case. Optionally, the conductive mechanism may also belong to the converging component.

Figure 3:
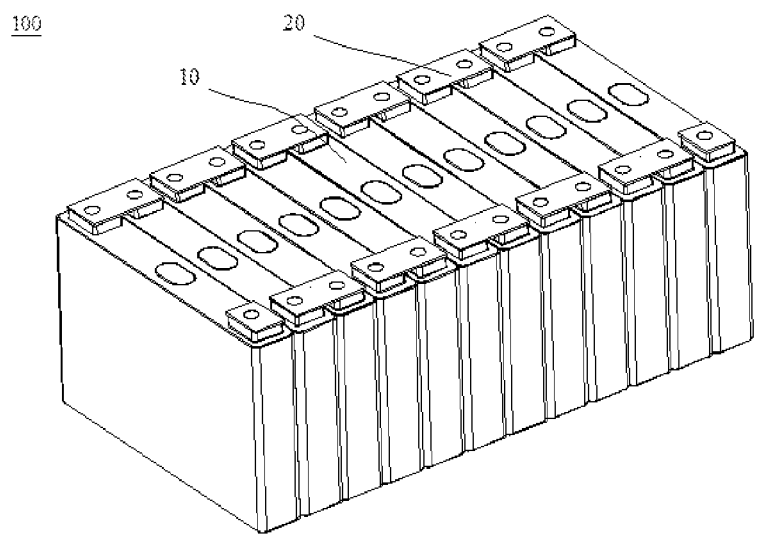
FIG. 3 is a schematic structural view of some embodiments of a battery module of the present disclosure.

According to different requirements for electricity, the battery module 100 may include one or more battery cells. As shown in FIG. 3, the battery module 100 includes a plurality of battery cells. The plurality of battery cells can be connected in series, in parallel, or in hybrid connection to achieve greater capacity or power. For example, the battery cell includes a lithium ion-containing secondary battery, a lithium ion primary battery, a lithium sulfur battery, a sodium lithium ion battery, or a magnesium ion battery, but is not limited thereto.

Figure 4:
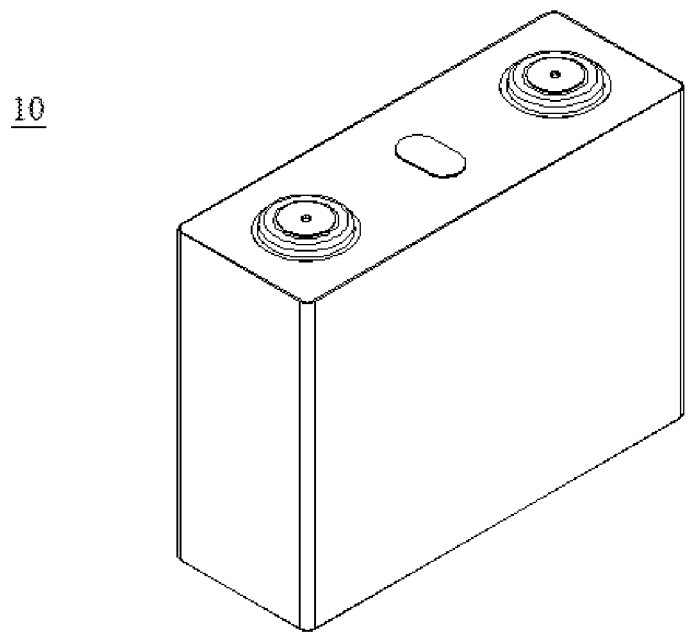
FIG. 4 is a schematic structural view of some embodiments of a battery cell of the present disclosure.
Figure 5:
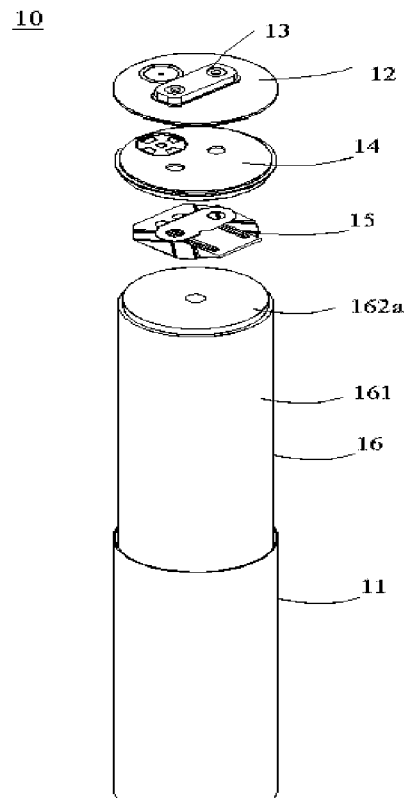
FIG. 5 is an exploded view of other embodiments of a battery cell of the present disclosure.
Figure 6:
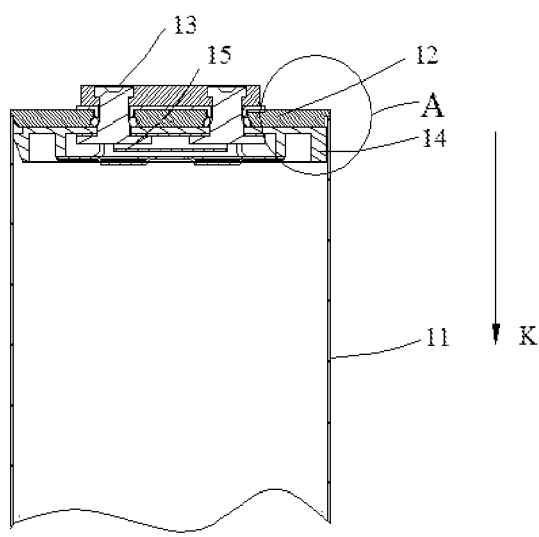
FIG. 6 is a cross-sectional view of some embodiments of a battery cell of the present disclosure.

In another embodiment of the present disclosure, the battery cell may be cylindrical, flat, square, or other shapes. For example, as shown in FIG. 4, the battery cell has a square structure. As another example, as shown in FIG. 5, the battery cell has a cylindrical structure. As shown in FIGS. 5 and 6, no matter the battery cell has any of the above structures, the battery cell includes an end cover assembly, a housing 11 and an electrode assembly 16. The housing 11 is hollow and includes an opening. The end cover assembly is connected to the opening of the housing 11. Optionally, the number of the end cover assemblies is equal to the number of the openings of the housing. For example, the number of the end cover assemblies and the number of the openings of the housing both are one or two.

The electrode assembly 16 is contained in the housing 11. The electrode assembly 16 can be formed by stacking or winding a positive electrode plate, a negative electrode plate, and a separator located between the positive electrode plate and the negative electrode plate. The separator between the positive electrode plate and the negative electrode plate is an insulator. Both the positive electrode plate and the negative electrode plate include a coated area and an uncoated area. A positive electrode plate active material is coated on the coated area of the positive electrode plate, and a negative electrode plate active material is coated on the coated area of the negative electrode piece. No active material is coated on the uncoated area. After winding or stacking, the uncoated area of the positive electrode plate forms a positive electrode tab, the uncoated area of the negative electrode plate forms a negative electrode tab, and the coated area of the positive electrode plate and the coated area of the negative electrode plate form a main body 161. The uncoated area of the positive electrode piece is laminated to form the positive electrode tab 162*a*, and the uncoated area of the negative electrode sheet is laminated to form the negative electrode tab (not shown in the drawings). The main body 161 includes two end faces oppositely arranged in a direction parallel to a winding shaft, the positive electrode tab 162*a* and the negative electrode tab may extend from the two end faces respectively, or may extend from one of the end faces.

The end cover assembly includes an end cover 12, an electrode terminal 13 and a current collecting member 15. The current collecting member 15 is located between the electrode assembly 16 and the end cover 12 and electrically connects the electrode assembly 16 and the electrode terminal 13.

There are two electrode terminals 13, and the two electrode terminals 13 are respectively a positive electrode terminal and a negative electrode terminal. The electrode terminals 13 are respectively located on flat surfaces of the two end covers 12, and each electrode terminal 13 is provided with one current collecting member 15 correspondingly. Each electrode assembly 16 includes a positive electrode tab 161 and a negative electrode tab. The positive electrode tab 161 is connected to the positive electrode terminal via one current collecting member 15 and the negative electrode tab 162 is connected to the negative electrode terminal via another current collecting member 15.

Figure 7:
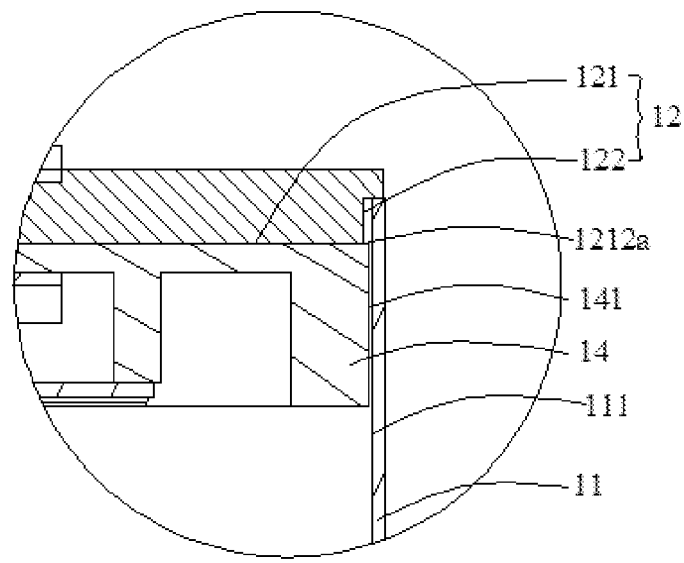
FIGS. 7, 8, 9 and 10 are respectively enlarged schematic views of four different structures at A in some embodiments shown in FIG. 6.

As shown in FIG. 6 which is a schematic structural view of a battery cell in a cross section parallel to a winding axis K of another embodiment of the present disclosure, FIG. 7 is an enlarged view of a structure at A in FIG. 6, and the battery cell 10 includes the end cover assembly and the housing 11. The housing 11 is hollow and includes the opening, the end cover assembly includes the end cover 12 and the insulator 14, and a periphery of the end cover 12 is combined with a frame at the opening of the housing 11 so that the end cover 12 covers the housing 11 and at least a part of the end cover 12 is inserted into the housing 11. The part of the end cover 12 inserted into the housing 11 includes an end surface 121 and a first side surface 122. The end surface 121 is substantially perpendicular to an insertion direction of the end cover 12, and the first side surface 122 is distributed along a periphery of the end surface 121 and is opposite to an inner wall surface 111 of the housing 11. The inner wall surface 111 is substantially parallel to the insertion direction of the end cover 121, and the end surface 121 and the first side surface 122 intersects to form a first edge 1212*a*. The insulator 14 is connected to the end surface 121. The insulator 14 extends beyond the first edge 1212*a* toward the inner wall surface 111 in a first direction and the first direction is a direction perpendicular to the insertion of the end cover 121 and toward the inner wall surface 111.

The battery cell can have a square structure or a cylindrical structure. When the battery cell has the square structure, the housing 11 has a hollow and approximately rectangular parallelepiped structure, and at least one end includes rectangular opening. In this case, a projection of the inner wall surface 111 also has a rectangular structure, and the end cover 12 has a plate structure adapted to the rectangular opening. When a battery box has a cylindrical structure, the housing 11 has a hollow cylindrical structure, and at least one end includes a circular opening. In this case, a projection of the inner wall surface 111 also has a circular structure, and the end cover 12 has a circular plate-shaped structure adapted to the circular opening. Regardless of the structure, the first direction is a direction perpendicular to the insertion direction of the end cover 121 and toward the inner wall surface 111.

The housing 11 and the end cover 12 are both made of metal, for example, both are made of aluminum or aluminum alloy. The end cover 12 is used to be connected to the opening of the housing 11, and the end cover 12 can be connected with the opening of the housing 11 in many ways, such as welding, riveting, threaded connection and the like. The connection ways described here mean that the end cover 12 and the housing 11 can be fixed in these connection ways. That is to say, the housing 11 and the end cover 12 of the battery box described in the embodiment may already be in a connected state or may be in a separated state.

At least a part of the end cover 12 is inserted into the housing 11. Optionally, when the end cover 12 is inserted into the housing 11, the end cover 12 can be completely located within the housing. In this case, an upper surface of the end cover 12 does not extend beyond an opening end surface of the housing 11. Optionally, a part of the end cover 12 may be located within the housing, and the other part needs to be overlapped on the opening end surface of the housing 11.

The end face 121 is substantially perpendicular to the insertion direction of the end cover 12. The term "substantially perpendicular" mentioned here is not strictly perpendicular. For example, there may be a certain angle between the insertion direction of the end face 121 and the end cover 12, such as less than 30 degrees.

The end surface 121 can be formed by one plane or two or more connected planes. Similarly, the first side surface 122 can be formed by one annular plane or two or more connected annular planes, and a projection of the annular plane along a direction perpendicular to the insertion direction of the end cover 12 is circular or square. For example, the end surface 121 is formed by one plane, and the first side surface 122 is formed by two intersecting planes. For another example, the end surface 121 is formed by one plane, and the first side surface 122 is formed by one plane. For another example, the end surface 121 is formed by two intersecting planes, and the first side surface 122 is formed by two intersecting planes. The term "plane" herein refers to a surface that is approximately smooth. A projection of the first edge along a direction perpendicular to the insertion direction of the end cover 12 is a bending line.

The insulator 14 is connected to the end surface 121, and the insulator 14 can be connected with the end surface 121 in many ways, for example, welding, riveting, screw connection and the like.

The insulator 14 extends beyond the first edge 1212*a* toward the inner wall surface 111 in the first direction. That is, at least a part of the insulator 14 is located between the first edge 1212*a* and the inner wall surface 111. The term "between" described here does not necessarily require that the insulator 14, the first edge 1212*a*, and the inner wall surface 111 are located in the same plane. For example, the insulator 14 has a first projection on a plane perpendicular to the insertion direction of the end cover, the first edge 1212*a* has a second projection on the plane perpendicular to the insertion direction of the end cover, the inner wall surface 111 has a third projection on the plane perpendicular to the insertion direction of the end cover, and at least a part of the first projection is located between the first projection and the third projection.

In an assembly process of the end cover assembly and the housing 11, in order to facilitate a mutual fit of the end cover 12 and the housing 11, a small assembly gap between the end cover 12 and the housing 11 is usually reserved to ensure a connection strength between them. When the end cover 12 and the housing 11 are made of metal material, in a process of inserting the end cover 12 into the housing 11, the first edge 1212a may scratch the inner wall surface 111 due to the small assembly gap reserved, thereby generating a metal wire. If the metal wire falls into the housing, it is easy to cause the positive electrode plate and the negative electrode plate to overlap and thus a short circuit. In view of the above problem, in the above-mentioned embodiment of the present disclosure, along the first direction, the insulator 14 is arranged to extend beyond the first edge 1212a toward the inner wall surface 111 along the first direction. That is, the insulator 14 extends between the first edge 1212a and the inner wall surface 111 along a direction perpendicular to the insertion direction of the end cover. During an insertion of the end cover 12 into the housing 11, a part of the insulator 14 located between the first edge 1212a and the inner wall surface 111 is closer to the inner wall surface 111 than the first edge 1212a. Therefore, the part of the insulator 14 located between the first edge 1212a and the inner wall surface 111 is easier to contact the inner wall surface 111. To a certain extent, the metal wire generated by the contact between the first edge 1212a and the housing 11 can be reduced and safety performance of the battery cell 10 can be improved.

In another embodiment of the present disclosure, the housing 11 is made of metal, and a hardness of the insulator 14 is less than a hardness of the housing 11. For example, a material of the housing 11 can be copper, aluminum, etc. For example, a material of the insulator 14 can be polypropylene, polyethylene, polyethylene terephthalate, etc. During an assembly process of the end cover 11 and the housing 11, as the hardness of the insulator 14 is less than the hardness of the housing 11, even if the insulator 14 scratches the inner wall surface 111 of the housing 11, no wire will be generated and safety performance of the battery cell will not be affected.

In another embodiment of the present disclosure, as shown in FIG. 7, the insulator 14 includes a second side surface 141, the second side surface 141 is disposed opposite to the inner wall surface 111, and at least a part of the second side surface 141 is located between the first edge 1212a and the inner wall surface. The term "between" mentioned here does not necessarily require that the second side surface 141, the first edge 1212a, and the inner wall surface 111 are located in the same plane. It may also be that, on a plane perpendicular to the insertion direction of the end cover 12, at least a part of a projection of the second side surface 141 is located between a projection of the first edge 1212a and a projection of the inner wall surface 111.

The term "opposite arrangement" not means strictly parallel. For example, there may be a certain angle between the second side surface 141 and the inner wall surface 111. The second side surface 141 surrounds around the insulator 14. The second side surface 141 can be formed by one annular plane or two or more connected annular planes. Here, the term "annular plane" can be parallel to the inner wall surface 111 or arranged obliquely with respect to the inner wall surface 111. The term "plane" herein refers to a surface that is substantially parallel, and a projection of the annular plane along a direction perpendicular to the insertion direction of the end cover 12 is circular or square.

In another embodiment of the present disclosure, as shown in FIG. 7, the second side surface 141 is substantially parallel to the inner wall surface 111, and along the first direction, the second side surface 141 is located between the first edge 1212a and the inner wall surface 111. In other words, the entire second side surface 141 is located between the first edge 1212a and the inner wall surface 111. During an assembly process of the end cover assembly and the housing 11, the second side surface 141 of the insulator 14 may be in contact with the inner wall surface 111, which may cause the insulator 14 to be slightly deformed. As the second side surface 141 is disposed to be substantially parallel to the inner wall surface 111, and the second side surface 141 is located between the first edge 1212a and the inner wall surface 111, a volume of the insulator 14 can be increased so that the insulator 14 does not deform when it contacts the inner wall surface 111.

Figure 8:
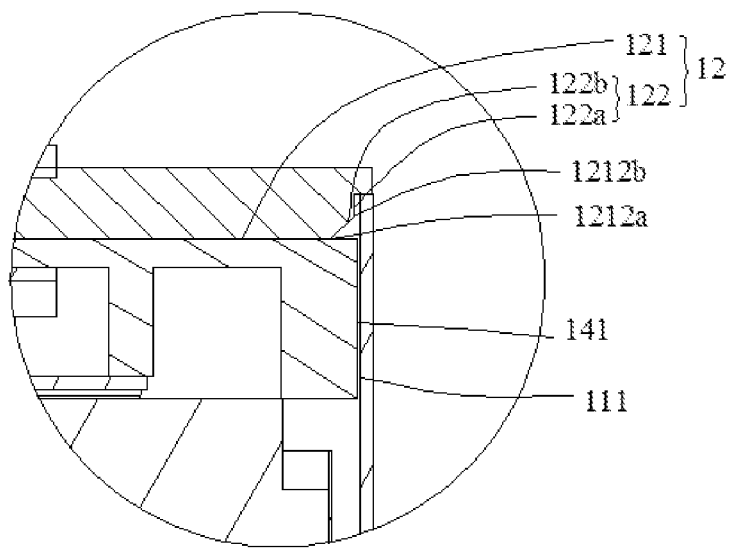

In another embodiment of the present disclosure, as shown in FIG. 8. The first side surface 122 includes a first surface 122a and a second surface 122b. The first surface 122a is substantially parallel to the inner wall surface 111. The second surface 122b connects the first surface 122a and the end surface 121, and is inclined in a direction away from the inner wall surface 111 relative to the first surface 122a to form a chamfered surface. The chamfered surface is formed by arranging the second surface 122b to be inclined in a direction away from the inner wall surface 111 relative to the first surface 122a. The chamfered surface in the text can be either a flat chamfered surface or a curved chamfered surface.

The first surface 122a is substantially parallel to the inner wall surface 111, so that dimensions of a gap between the first surface 122a and the inner wall surface 111 are equal. When the end cover 12 is inserted into the housing, as the first surface 122a and the inner wall surface 111 are fixed by welding and the first surface 122a is provided to be substantially parallel to the inner wall surface 111, welding reliability between the first surface 122a and the inner wall surface 111 can be consistent.

The second surface 122b is inclined in a direction away from the inner wall surface 111 relative to the first surface 122a to form the chamfered surface, so that dimensions of a gap between the second surface 122b and the inner wall surface 111 becomes larger and larger along the insertion direction of the end cover 12. Therefore, the end cover 12 can be inserted into the housing 11 more conveniently.

In the above embodiment, the second surface 122b intersects the end surface 121 to form the first edge 1212a, the second surface 122b intersects the first surface 122a to form a second edge 1212b, and the second edge 1212b is located between the first edge 1212a and the inner wall surface 111. In other words, along the first direction, the second edge 1212b is closer to the inner wall surface 111 than the first edge 1212a.

Optionally, the second side surface 141 is located between the second edge 1212 and the inner wall surface 111. In other words, on a plane perpendicular to the insertion direction of the end cover 12, at least a part of the projection of the insulator 14 is located between the projection of the second edge 1212b and the projection of the inner wall surface 111. During the insertion of the end cover 12 into the housing, the second side surface 141 of the insulator 14 prevent the first edge 1212a and the second edge 1212b at the same time from scratching the inner wall surface 111 to avoid generation of metal wires.

Optionally, the second side surface 141 is located between the first edge 1212a and the second edge 1212b. That is, on a plane perpendicular to the insertion direction of the end cover 12, at least a part of the projection of the insulator 14 is located between the projection of the first edge 1212a and the projection of the second edge 1212b. As the second side surface 141 is disposed between the first edge 1212b and the first edge 1212b, the first edge 1212a can be prevented from scratching the inner wall surface 111 to a certain extent, and dimensions of the gap between the second side surface 141 and the inner wall surface 111 can also be ensured to be large enough to facilitate the insertion of the insulator 14 into the housing.

Figure 9:
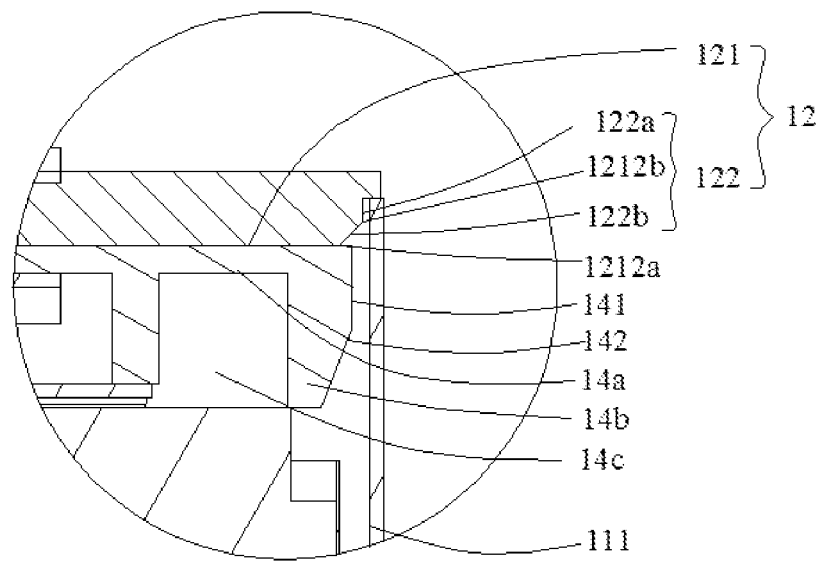

In another embodiment of the present disclosure, as shown in FIG. 9, the insulator 14 includes a third side surface 142. The third side surface 142 is connected to an end of the second side surface 141 away from the end surface 121 and is inclined in a direction away from the inner wall surface 111 with respect to the second side surface 141 to form a chamfered surface. That is, dimensions of a gap between the third side surface 142 and the inner wall surface 111 gradually increases along the insertion direction of the end cover 12, so that the insulator 14 can be inserted into the housing 11 more easily.

Figure 10:
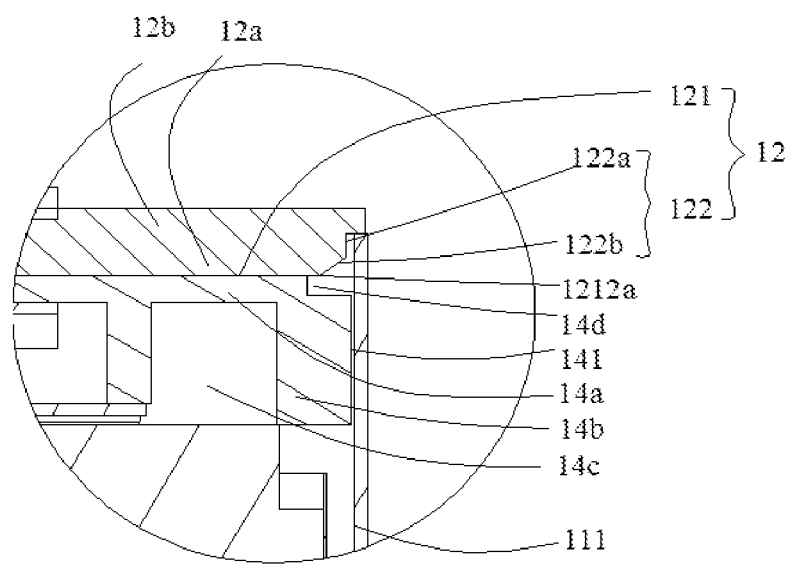

In another embodiment of the present disclosure, as shown in FIG. 10, the insulator 14 includes a fixing part 14a and a side part 14b that are connected to each other. The fixing part 14a is used to be connected to the end surface 121, and the side part 14b is located on a side of the fixing part 14a away from the end surface 121 is vertical and distributed along a periphery of the fixing part 14a. The second side surface 141 is located on a surface of the side part 14b opposite to the inner wall surface 111.

Optionally, as shown in FIG. 10, the insulator 14 includes a first recess 14c. An opening of the first recess 14c faces an inside of the housing 11. The side part 14b constitutes a side wall of the first recess 14c. The fixing part 14a constitutes a bottom wall of the first recess 14c. As the first recess 14c is provided, other mechanical parts (for example, the current collecting member) are allowed to be accommodated in the first recess 14c to reduce space occupied by other mechanical parts and thus increase energy density.

Optionally, as shown in FIG. 10, when the end cover 12 and the housing 11 are fixed by laser welding, there is a second recess 14d at a connection between the side part 14b and the fixing part 14a. In a direction perpendicular to the insertion direction of the end cover 12, the second recess 14d is recessed in a direction away from the inner wall surface 111 relative to the second side surface 141, and an opening of the second recess 14d faces the inner wall surface 111. After the end cover 12 is inserted into the housing 11, the end cover 12 is usually fixed to the housing 11 by laser welding. Furthermore, in order to facilitate an assembly of the end cover 12 and the housing 11, a gap is usually provided between the first surface 122a and the inner wall surface 111 of the housing 11, and the gap may cause a risk of laser leakage. Therefore, a part of the insulator 14 opposite to the gap may be caused to melt, and gas generated by the melting may cause reliability of the wielding between the end cover 12 and the housing 11 to get worse. In this embodiment, as the second recess 14d is provided at the connection between the side part 14b and the fixing part 14a, a distance between a solid portion of the insulator 14 and the welding portion is increased. Therefore, the gas generated can be reduced to a certain extent to ensure welding strength. Optionally, the second recess 14d is ring-shaped and surrounds a peripheral side of the insulator 14.

Optionally, as shown in FIG. 10, along a direction perpendicular to the insertion direction of the end cover 12, the bottom wall of the second recess 14d is located on a side of the first edge 1212a away from the inner wall surface 11. In other words, under a premise of ensuring strength of the insulator, more portions of the insulator 14 can be protected from laser damage to ensure welding strength.

In another embodiment of the present disclosure, as shown in FIG. 10, the end cover 12 includes an insertion part 12a and a connection part 12b. The insertion part 12a is located within the housing 11, and the first side surface 122 is located at the insertion part 12a. Along a direction perpendicular to the insertion direction of the end cover 12, a portion of the connection part 12b beyond the insertion part 12a is used to be connected to the end surface of the opening of the housing 11.

The battery cell, battery, and electrical device of the embodiments of the present disclosure are described above. A method and device for preparing the battery cell of the embodiments of the present disclosure will be described below, and portions that are not described in detail can be referred to the foregoing embodiments.

Figure 11:
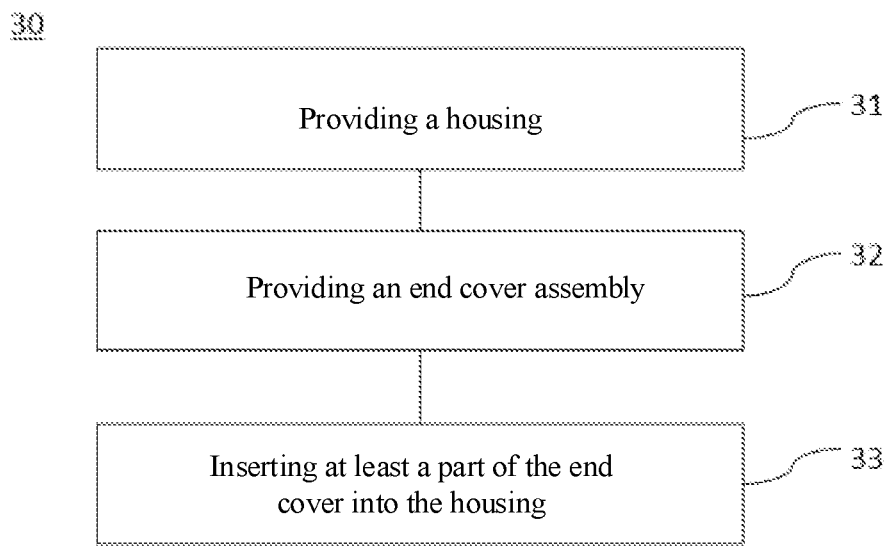
FIG. 11 is a schematic flowchart of some embodiments of a method for preparing a battery cell of the present disclosure.

FIG. 11 shows a schematic flowchart of a method 30 for preparing a battery cell according to an embodiment of the present disclosure. As shown in FIG. 11, the method 30 may include:

31, providing a housing being hollow and including an opening, 32, providing an end cover assembly including an end cover and an insulator, and 33, inserting at least a part of the end cover into the housing. The end cover is used to be connected to the opening of the housing and a part of the end cover inserted into the housing includes an end surface and a first side surface. The end surface is substantially perpendicular to an insertion direction of the end cover. The first side surface is distributed along a periphery of the end surface and is opposite to an inner wall surface of the housing, and the inner wall surface is substantially parallel to the insertion direction of the end cover. The end surface and the first side surface intersect to form a first edge.

The insulator is connected to the end surface and extends beyond the first edge toward the inner wall surface in a first direction. The first direction is perpendicular to the insertion direction of the end cover and toward the inner wall surface.

Figure 12:
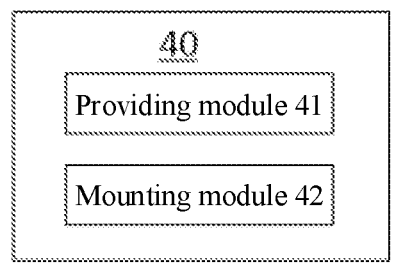
FIG. 12 is a schematic block view of some embodiments of a device for preparing a battery cell of present disclosure.

FIG. 12 shows a schematic block view of a device 40 for preparing a battery cell of an embodiment of the present disclosure. As shown in FIG. 12, the device 40 for preparing a battery cell includes:

a providing module 41 for providing a housing being hollow and including an opening, and for providing an end cover assembly including an end cover and an insulator, and a mounting module 42 for inserting at least a part of the end cover into the housing. The end cover is used to be connected to the opening of the housing and the part of the end cover inserted into the housing includes an end surface and a first side surface. The end surface is substantially perpendicular to an insertion direction of the end cover. The first side surface is distributed along a periphery of the end surface and is opposite to an inner wall surface of the housing, and the inner wall surface is substantially parallel to the insertion direction of the end cover. The end surface and the first side surface intersect to form a first edge The insulator is connected to the end surface and extends beyond the first edge toward the inner wall surface in a first direction. The first direction is perpendicular to the insertion direction of the end cover and toward the inner wall surface.

Finally, it should be noted that the above embodiments are only used to illustrate, not to limit the technical solutions of the present disclosure. Although the present disclosure has been described in detail with reference to the foregoing embodiments, those skilled in the art should understand that the technical solutions described in the foregoing embodiments can be modified, or some of the technical features can be equivalently replaced, and these modifications or replacements do not cause an essence of the corresponding technical solution to deviate from the gist and scope of technical solutions of embodiments of the present disclosure.

What is claimed is:

1. A battery cell characterized by comprising:
a housing being hollow and comprising an opening,
an end cover assembly comprising an end cover and an insulator, a periphery of the end cover being directly combined with a frame at the opening of the housing so that the end cover covers the housing and is connected to the opening of the housing and at least a part of the end cover being inserted into the housing, the housing and the end cover being both metallic, the end cover being welded to the opening of the housing, the part of the end cover inserted into the housing comprising an end surface and a first side surface, wherein the end surface is substantially perpendicular to an insertion direction of the end cover, the first side surface is distributed along a periphery of the end surface and faces an inner wall surface of the housing, and wherein the inner wall surface is substantially parallel to the insertion direction of the end cover, and the end surface and the first side surface intersect to form a first edge, and
an electrode assembly contained in the housing, the end surface of the end cover facing the electrode assembly, wherein the insulator is connected to the end surface and is located, in its entirety, at a side of the end cover where the end surface is located, the insulator extends beyond the first edge toward the inner wall surface in a first direction, an clearance exists between the insulator and the inner wall surface in the first direction, and the first direction is a direction perpendicular to the insertion direction of the end cover and towards the inner wall surface.

2. The battery cell according to claim 1, characterized in that the insulator comprises a second side surface, the second side surface is substantially parallel to the inner wall surface, and along the first direction, the second side surface is located between the first edge and the inner wall surface.

3. The battery cell according to claim 2, characterized in that the first side surface comprises a first surface and a second surface, the first surface is substantially parallel to the inner wall surface, and the second surface connects the first surface and the end surface and is inclined to form a chamfered surface in a direction away from the inner wall surface relative to the first surface, and the second surface intersects the end surface to form the first edge, the second surface intersects the first surface to form a second edge, and the second edge is located between the first edge and the inner wall surface.

4. The battery cell according to claim 3, characterized in that along the first direction, the second side surface is located between the second edge and the inner wall surface.

5. The battery cell according to claim 3, characterized in that the second side surface is located between the first edge and the second edge.

6. The battery cell according to claim 2, characterized in that the insulator comprises a third side surface connected to the second side surface, the third side surface is connected to an end of the second side surface away from the end surface, and is inclined to form a chamfered surface in a direction away from the inner wall surface relative to the second side surface.

7. The battery cell according to claim 2, characterized in that the insulator comprises a fixing part and a side part connected to each other, the fixing part is connected to the end surface, the side part is located on a side of the fixing part away from the end surface and distributed along a periphery of the fixing part, and the second side surface is located on a surface of the side part opposite to the inner wall surface.

8. The battery cell according to claim 7, characterized in that a recess is provided at a connection between the side part and the fixing part, the recess is disposed opposite to the inner wall surface, and an opening of the recess is opposite to the inner wall surface.

9. The battery cell according to claim 8, characterized in that a bottom wall of the recess is located on a side of the first edge away from the inner wall surface.

10. The battery cell according to claim 2, characterized in that the end cover comprises an insertion part and a connection part, the insertion part is located within the housing, the first side surface is located on a surface of the insertion part opposite to the inner wall surface, and along the first direction, the connection part extends beyond the insertion part.

11. The battery cell according to claim 1, wherein the housing is made of metal, and a hardness of the insulator is less than a hardness of the housing.

12. The battery cell according to claim 7, wherein the insulator comprises a first recess, an opening of the first recess faces an inside of the housing, the side part constitutes a side wall of the first recess, and the fixing part constitutes a bottom wall of the first recess.

13. The battery cell according to claim 8, wherein the recess is ring-shaped and surrounds a peripheral side of the insulator.

14. The battery cell according to claim 11, wherein a material of the housing is copper or aluminum.

15. The battery cell according to claim 11, wherein a material of the insulator is polypropylene, polyethylene, or polyethylene terephthalate.

16. A battery, characterized by comprising:
a plurality of battery cells according to claim 1;
a converging component for electrically connecting the plurality of battery cells;
a case for accommodating the plurality of battery cells and the converging component.

17. The battery according claim 16, wherein the case comprises a first portion and a second portion, the first portion covers the second portion and thus they are connected together.

18. The battery according claim 17, wherein each of the first portion and the second portion comprises an opening, both the first portion and the second portion are hollow cuboids and each has only one face as an opening face.

19. The battery according claim 18, wherein the opening of the first portion and the opening of the second portion are arranged oppositely, and the first portion covers the second portion to form the case with a closed chamber.

20. An electrical device comprising the battery according to claim 16.

* * * * *